United States Patent [19]
Lee

[11] Patent Number: 5,757,936
[45] Date of Patent: May 26, 1998

[54] AUDIO AND VIDEO SIGNAL DISTRIBUTION SYSTEM AND METHOD

[75] Inventor: Noel Lee, Daly City, Calif.

[73] Assignee: Monster Cable International, Ltd., Bermuda

[21] Appl. No.: 438,284

[22] Filed: May 10, 1995

[51] Int. Cl.$^6$ ............................................. H04B 3/00
[52] U.S. Cl. ............................... 381/77; 340/310.01
[58] Field of Search ............................ 381/3, 77, 105; 340/310.01, 310.08

[56] References Cited

U.S. PATENT DOCUMENTS

| | | | |
|---|---|---|---|
| 4,442,319 | 4/1984 | Treidl | 340/310.01 |
| 4,829,570 | 5/1989 | Schotz | 381/3 |
| 4,847,903 | 7/1989 | Schotz . | |
| 4,975,964 | 12/1990 | Hochstein . | |
| 4,980,665 | 12/1990 | Schotz . | |
| 4,991,207 | 2/1991 | Shiraishi et al. | 381/77 |
| 5,313,524 | 5/1994 | Van Hulle et al. | 381/77 |
| 5,327,230 | 7/1994 | Dockery . | |
| 5,596,647 | 1/1997 | Wakai et al. | 381/77 |

Primary Examiner—Curtis Kuntz
Assistant Examiner—Vivian Chang
Attorney, Agent, or Firm—Haynes and Boone, L.L.P.

[57] ABSTRACT

A system for distributing one of a plurality of input signals from one location in a building having standard AC power to another location in the building. An input signal is selected by a switcher and, if it is an analog signal, it is converted to a digital signal. The digital signal is then processed to enable it to be superimposed on, and transmitted over, an AC power line to the other location. At the other location the transmitted digital signal is processed again to restore it to its original digital format at which time it can be passed directly to a digital amplifier or converted to an analog signal for further processing.

2 Claims, 1 Drawing Sheet

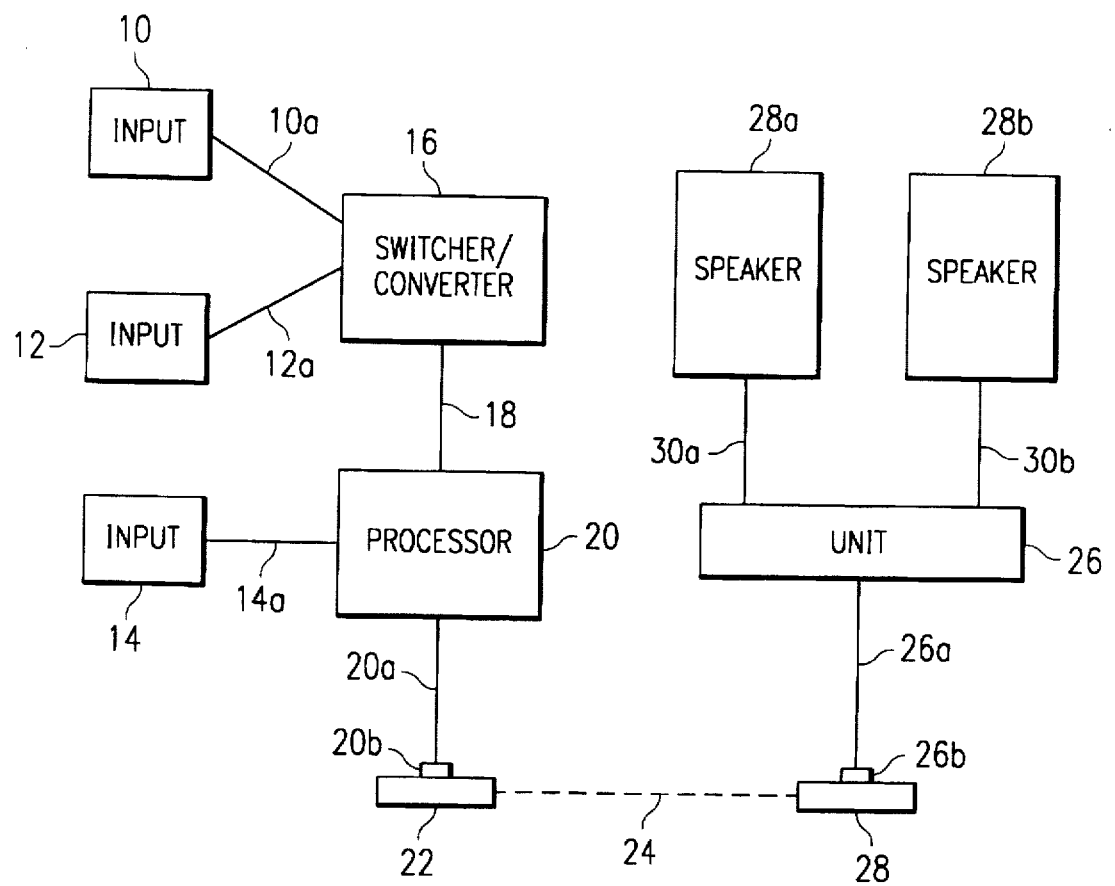

AUDIO AND VIDEO SIGNAL DISTRIBUTION SYSTEM AND METHOD

BACKGROUND OF THE INVENTION

This invention relates to the distribution of output signals from a central location to one or more remote locations and, more particularly, to the distribution of digital signals in this manner.

An application of the present invention is in home audio and video entertainment systems in which one or more source components, such as a cassette deck, a phonograph record, an FM tuner, and/or a VCR are located in one room of the house along with loudspeakers for reproducing their output signals. In order to reproduce these signals through loudspeakers located in other rooms of the house, speaker wire has to be run from the components, through one or more walls of the house and to the remote loudspeakers. Unless the house is prewired in this manner during construction, it is often very difficult to do this, and, even if it is done, it often results in unsightly speaker wire being exposed.

Other problems with these systems are encountered when one or more of the source components produce digital output signals such as in the case of laser disc players, compact disc players and digital audio tape decks, since these signals cannot be treated in the same manner as the analog signals discussed above.

BACKGROUND OF THE INVENTION

It is therefore an object of the present invention to provide a system and method for transmitting audio and video signals from one or more program sources to one or more remote locations.

It is a further object of the present invention to provide a system and method of the above type in which the source signals can be both analog and digital signals.

It is a still further object of the present invention to provide a system and method of the above type in which the analog source signals are converted to digital signals and transmitted, with the digital source signals, to the remote location.

It is a still further object of the present invention to provide a digital amplifier and digital-to-analog converter at the remote location that receive the transmitted digital signals and connect to the loudspeaker to drive same.

Toward the fulfillment of these and other objects, according to the system and method of the present invention, the input sources are connected to a processor/converter that converts the analog signals to digital signals and retains the original digital source signals in their original form. Both the converted and the original digital signals are combined and transmitted to the remote location. A processor/amplifier is provided at the remote location that functions to receive the transmitted digital signals, restore the signals to their original form and amplify them. The signals are then passed to a digital-to-analog converter for converting the signals to analog signals which are then transmitted to loudspeakers at the remote location.

BRIEF DESCRIPTION OF THE DRAWINGS

The above brief description, as well as further objects, features and advantages of the present invention will be more fully appreciated by reference to the following detailed description of the presently preferred but nonetheless illustrative embodiments in accordance with the present invention when taken in conjunction with the accompanying drawing which is a schematic view of the system of the present invention.

DESCRIPTION OF THE PREFERRED EMBODIMENT

The drawing depicts the system of the present invention installed in a house having three input sources 10, 12 and 14 located in one room of the house. Each input source 10, 12 and 14 can be either an analog source, such as a phonograph record player, and/or an FM tuner or an analog cassette deck; or a digital source, such as a compact disc player or a digital audio tape deck. The system of the present invention includes a switcher/converter unit 16 connected to the sources 10, 12 and 14 by standard "interconnect" cables 10a, 12a and 14a, respectively, which can be the same cables that would be used to connect the sources to an amplifier, preamplifier or stereo receiver in a typical home installation. Although each input source produces a stereo (left and right) audio signal in a conventional manner only one cable is shown in the interest of clarity. Of course, if surround sound is involved at least two additional audio signals would be involved and, if video is involved, such as in case if one of the sources is a VCR, a satellite dish or a laser disc player, an additional video signal would be involved. For the purposes of example, it will be assumed that the input source 10 is an analog cassette deck and the source 12 is an analog FM tuner, each of which produces two (stereo) analog output signals; while the source 14 is a digital compact disc player, which produces two (stereo) digital output signals.

The switcher/converter unit 16 has multiple functions. First, it includes a signal switching system for selecting one of the stereo output signals from the sources 10, 12 and 14 for processing. It also includes a conventional analog-to-digital converter for converting the selected analog signal received from any of the sources 10, 12 and 14 to a digital signal, which in the present example would be the sources 10 and 12. If the selected source signal is digital, which, in the example would be the compact disc player 14, then the latter signal is not further processed by the unit 16. After the above switching and converting the two (stereo) digital signals are then passed from the output terminals of the unit 16, via two cables, one of which is shown by the reference numeral 18, to a processor 20 for further processing to condition them to be transferred to a remote location. This transfer process can be done in any known manner such as in the manner taught in U.S. Pat. No. 4,829,570 the disclosure of which is hereby incorporated by reference, with the exception that the processor 20 would receive digital signals from the unit 16 in the present invention as opposed to analog signals per the latter patent.

According to the technique disclosed in the '570 patent, which also applies to the present invention, the stereo signals are each initially amplified in the processor, then compressed to reduce their dynamic range after which they are pre-emphasized to increase the signal strength of the higher frequency signals included in the compressed audio signals supplied by the compressing circuit. The signals are then converted into two separate FM (frequency modulation) signals by variable frequency oscillators operating at two different carrier frequencies after which the signals are passed through a tuned network and then to one end of a standard AC (alternating current) cable 20a. A plug 20b is provided on the other end of the cable and is adapted for insertion into a standard household AC power outlet 22 connected to a conventional AC power line 24 for the household that extends to the remote location. Thus, the cable 20a transmits the two processed digital signals to the remote location.

A unit 26 is provided at the remote location and is adapted to receive the transmitted digital signals from the AC power line 24, process the digital signals in a manner to restore the signals to their original form in a manner to be described, convert the digital signals to analog signals, and amplify the signals. To this end, the unit 26 is connected to the AC power line 24 by a cable 26a connected at one end to the unit 26 and at the other end to an AC plug 26b which is inserted into a standard outlet 28 connected to the power line 24 at the remote location. Thus, the digital signals from the unit 16 are transmitted to the unit 26 via the power line 24.

The unit 26 operates in an identical manner disclosed in the above-identified patent to restore the processed digital signals to their original form and, as such, contains a filter circuit for filtering any 60 Hz AC power signal while passing the two FM digital signals. The two outputs from the filter circuit are amplified and additionally filtered in the unit 26 before being demodulated by a phase loop detector to provide two (stereo) digital outputs. The latter signals are then de-emphasized in the unit 26 and then expanded to their original dynamic range by an expander circuit.

According to a feature of the present invention which is not disclosed in the '570 patent, two digital amplifiers are included in the unit 26 which respectively amplify the two restored signals to levels sufficient to drive two loudspeakers. To this end, the restored signals in the unit are then converted to analog signals and amplified to a level to drive loudspeakers, in a conventional manner. The unit 26 has two (stereo) outputs which are connected to the input terminals of two loudspeakers 28a and 28b, respectively, also located at the remote location. According to a feature of the present invention, a pair of jacks 30a and 30b are provided on the output terminals of the unit 26 and are directly connected to corresponding jacks or terminals on the loudspeakers 28a and 28b. For example, the jacks 30a and 30b could be male plugs and the corresponding terminals on the loudspeakers 28a and 28b could be female receptacles. Thus, unit 26 is connected directly to the loudspeakers 28a and 28b thus eliminating the need for cables, wires or the like.

As a result of all of the foregoing, the loudspeakers 28a and 28b are driven by the restored analog left channel audio signal received from the selected input source 10, 12 or 14, and the loudspeaker 36 is driven by the restored right channel stereo audio signal, after the processing, transmission and amplification discussed above.

Thus, the system and method thus described enjoys the advantages of enabling one of a plurality of analog and digital sources to be selected, the analog signals converted to digital and the digital signals transmitted to a remote location. Also, it permits the transmitted digital signals to be restored to their original form at the remote location, amplified and converted to analog signals, for driving one or more loudspeakers. Also the unit 16 can be mounted in the loudspeakers at the remote location thus eliminating the need for relative long cables or wires.

It is understood that the present invention is not limited to the processing of two stereo signals as described above for the purposes of example only. For example, the invention lends itself to multichannel audio applications such as five or six channel surround sound systems and audio and video applications such as in the case of home theater installations.audio. Also, the units 20 and 26 can have separate power cables for connection to the power line 24 to supply AC power to the units in a conventional manner, or the latter connections can be made through the cables 20a and 26a, respectively. Further, the unit 26 can be installed in the interior of one of the loudspeakers 28a or 28b in which case the cable 26a would extend to the loudspeaker and a connection made from the latter loudspeaker to the other loudspeaker. Also the unit 26 can be divided into two separate modules which are connected to, or installed within, the loudspeakers 28a and 28b in the manner discussed above. Further, the unit 26 can be used for restoring the digital signals to their original form in the manner discussed above and two separate converters and amplifiers can be provided to perform the conversion and amplification discussed above. It is understood that other techniques can be utilized to transfer the digital signals from the source location to the remote location. For example, the technique disclosed in U.S. Pat. No. 5,327,230 can be used, the disclosure of this patent hereby being incorporated by reference.

Still other variations may be made in the present invention by those skilled in the art without departing from the invention as defined in the appended claims.

What is claimed is:

1. In a system having a plurality of sources of digital and analog signals in one location in a building having standard AC power lines and one or more units for utilizing the signals in another location in the building, wherein the improvement comprises a switcher for selecting one of the sources at the one location, a convertor for converting any selected analog signal into a corresponding digital signal, a processor for processing the digital signal to enable it to be superimposed on and transmitted over an AC power line to said second location, means for receiving the transmitted digital signal from said AC power line at said second location and restoring the digital signal to its original form, and a convertor located at the other location for converting the restored digital signal to an analog signal for use at the other location.

2. A method of selectively distributing the digital and analog signals from one of a plurality of input sources in one location in a building having standard AC power lines to one or more units for utilizing the signals in another location in the building, the method comprising the steps of selecting one of the input sources for distribution, determining if the selected input source is an analog or digital signal and, if an analog signal, converting it to a corresponding digital signal, processing the digital signal to enable it to be superimposed on and transmitted over an AC power line to said other location, receiving the transmitted digital signal from said AC power line at said other location, restoring the transmitted digital signal to its original form, and converting the restored digital signal to an analog signal for use at the second location.

* * * * *